Sept. 1, 1959 T. ISHAM 2,902,266
TEMPERATURE EXCHANGER
Filed Dec. 17, 1957 2 Sheets-Sheet 1
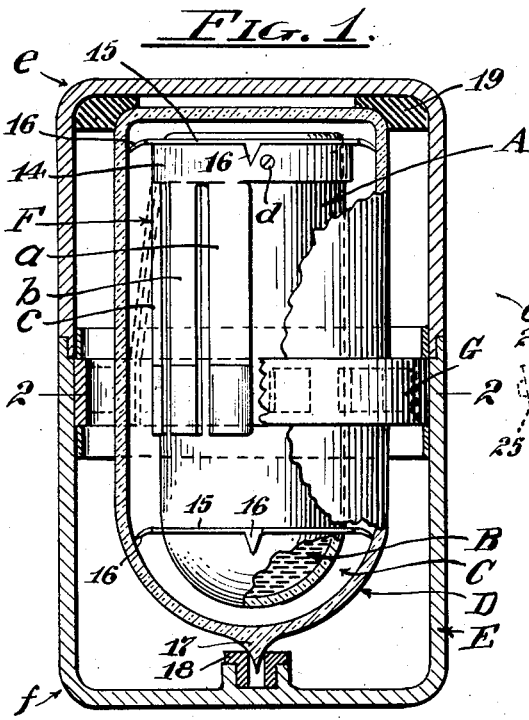
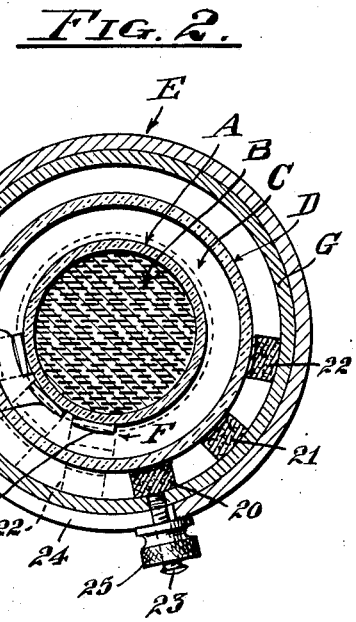
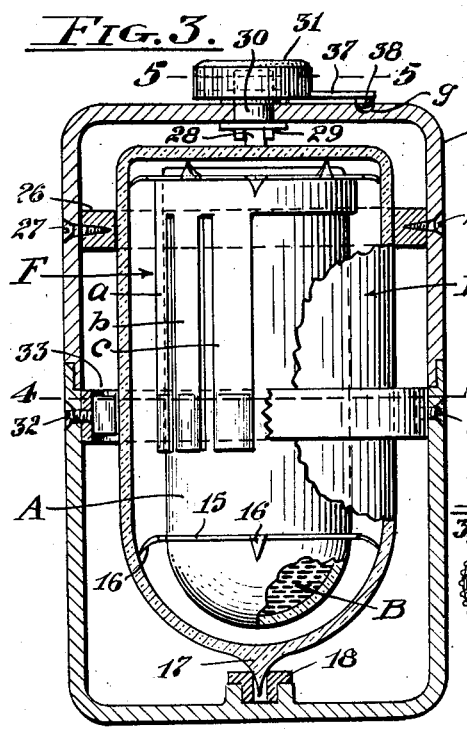
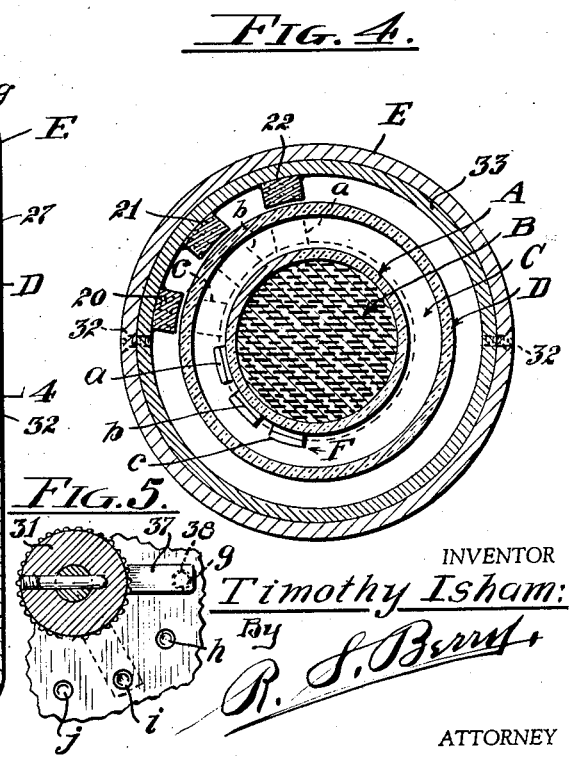
INVENTOR
Timothy Isham:
by
R. S. Berry
ATTORNEY Sept. 1, 1959            T. ISHAM            2,902,266
TEMPERATURE EXCHANGER
Filed Dec. 17, 1957            2 Sheets—Sheet 2
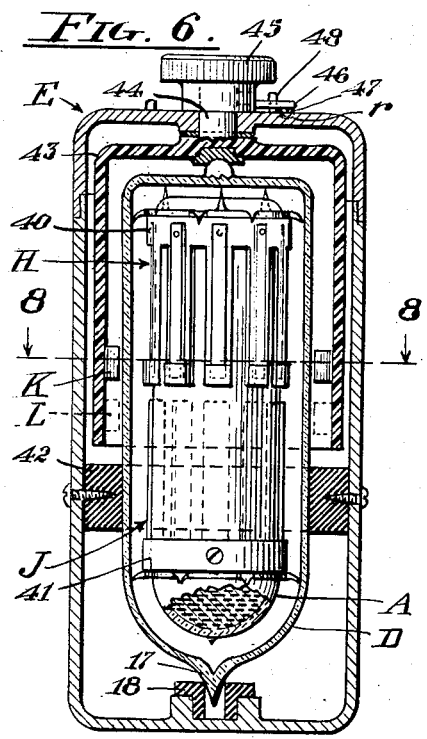
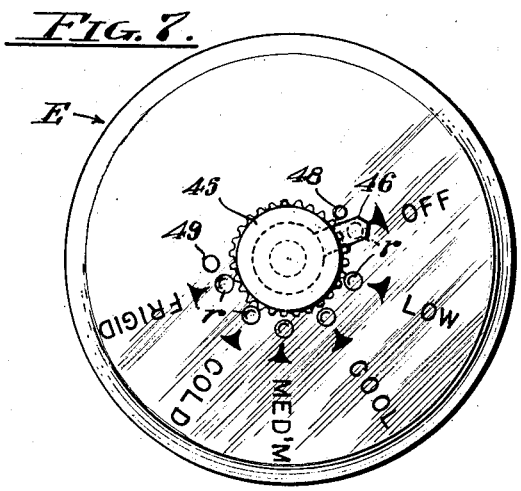
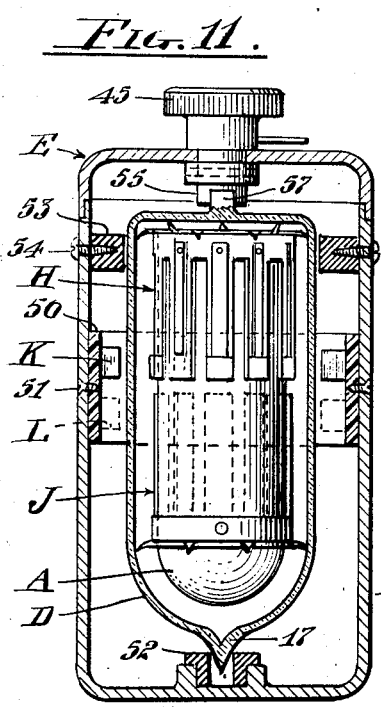
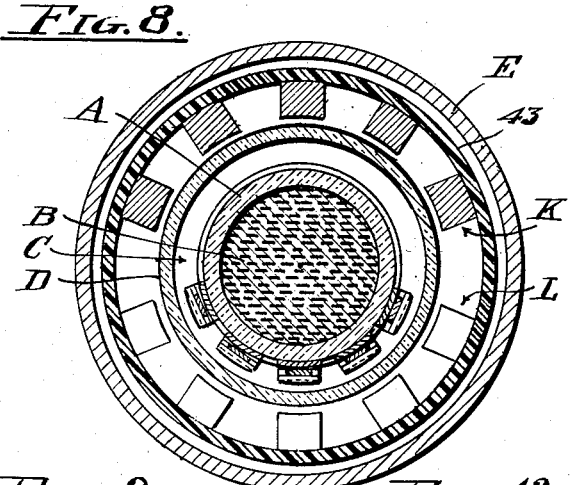
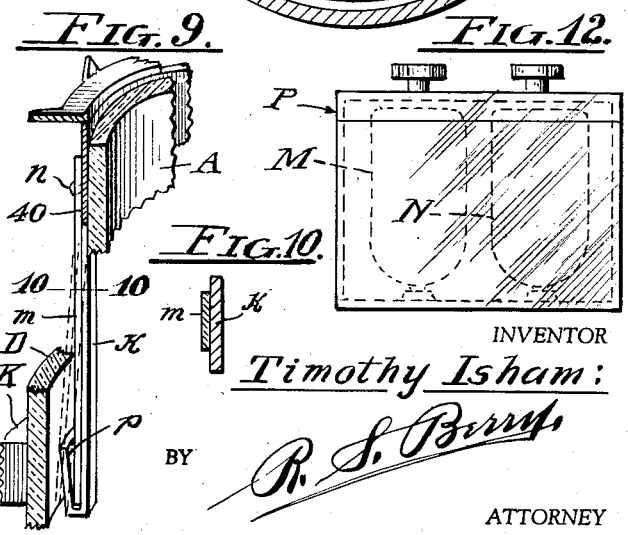
INVENTOR
Timothy Isham:
BY R. S. Berry
ATTORNEY United States Patent Office 2,902,266
Patented Sept. 1, 1959

2,902,266

TEMPERATURE EXCHANGER

Timothy Isham, Los Angeles, Calif.

Application December 17, 1957, Serial No. 703,344

10 Claims. (Cl. 257—263)

This invention relates to a temperature exchanger and has as its primary object the maximum restriction of and a mechanical means for the release of varied temperature to an area or areas where it is desirable to regulate with a given temperature or range of temperatures.

An object of the invention therefore, is the provision of a device which is adapted to be charged with a predetermined temperature and embodying a cell in an insulated shell for confining the charged temperature and including manually controlled means for effecting discharge of said temperature from said cell at various degrees between the cell and the outer shell and its immediate surroundings.

Another object is to provide a device embodying a temperature absorbing and retaining cell adapted to be charged with a selected temperature as in a refrigerator or heated compartment and in which the temperature obtained may be retained for a prolonged period of time and liberated at the will of an operator to effect a temperature changing action for whatever purpose a varied temperature is found desirable.

The invention resides generally in the provision of a cell comprising a sealed vessel containing a substance capable of being charged with a given temperature, together with a housing encompassing the cell in spaced insulated relation thereto and including manually controlled magnetically operated means for disposing the cell and the housing in temperature conductive relation to each other such that a desired temperature will be transmitted through the housing to the cell to charge the latter, or transmitted from the cell through the housing to thereby change the temperature of the latter.

With the foregoing objects in view together with such other objects and advantages as may subsequently appear, the invention resides in the parts and in the combination, construction and arrangement of parts hereinafter described and claimed, and illustrated by way of example in the accompanying drawings in which:

Fig. 1 is a view partly in section and partly in elevation of one form of the device and showing the parts in a neutral position;

Fig. 2 is a view in horizontal section taken on the line 2—2 of Fig. 1;

Fig. 3 is a view similar to Fig. 1 showing a modification of the device;

Fig. 4 is a view in horizontal section taken on the line 4—4 of Fig. 3;

Fig. 5 is a detail in section and plan as seen on the line 5—5 of Fig. 4;

Fig. 6 is a view partly in section and partly in elevation of another form of the device showing the parts in a neutral position;

Fig. 7 is an enlarged plan view of the device shown in Fig. 6;

Fig. 8 is an enlarged horizontal section taken on the line 8—8 of Fig. 6;

Fig. 9 is a diagram in section and perspective of a fragmentary portion of the device shown in Figs. 6, 7 and 8 depicting the manner of placing the temperature retaining and dispensing cell in and out of conductive relation to its housing;

Fig. 10 is a detail in section taken on the line 10—10 of Fig. 9;

Fig. 11 is a view in vertical section partly in elevation showing another modification of the invention; and Fig. 12 is a diagram depicting the manner in which a multiple of temperature dispensing elements may be assembled in a unit.

Referring to the drawings more specifically wherein corresponding reference characters are employed throughout the several views to indicate corresponding elements, A indicates generally a cell comprising a hermetically sealed cylindrical glass or plastic cartridge containing a body B, such as calcium chloride jelly or other substance, capable of being charged with and of retaining heat or cold. The cell A is confined in a vacuum chamber C within a glass or plastic shell D similar to the outer wall of the conventional vacuum bottle, the cell A being fixedly supported in the shell D in spaced relation thereto except as to pin-points bearing between the end portion of the cell A and the adjacent end portions of the shell D as will be later described. The shell D is enclosed in a cylindrical housing E with its side walls in spaced relation to the adjacent walls of the housing.

Mounted on the cell A is a series of spring contact tongues F extending longitudinally of the cell A and normally lying close to the surface thereof out of contact with the inner face of the shell D, which tongues are designed to be actuated by magnetic attraction to be brought into contact with the inner face of the shell D and thus effect temperature conductive connection between the cell A and shell D across the vacuum chamber C as will presently be described.

Manifestly any suitable number of the tongues F may be provided according to the desired capacity of the device, but in order to adapt the device for dispensing various degrees of temperature a plurality of the contact tongues is provided and arranged so that one or more of the tongues may be disposed in conductive position when so desired.

As shown in Figs. 1 to 4 inclusive, a series of three of the tongues F are employed, designated at $a$, $b$ and $c$, which tongues extend unitarily from one margin of a flat metallic ring 14 encompassing one end portion of the cell A, the tongues projecting along the surface of the cell A toward the other end portion thereof and here shown as disposed within a quarter-segment of the perimeter of the cell. The ring 14 intimately contacts the outer surface of the cell A in frictional engagement therewith but may be secured in place by a clamp screw $d$ or other suitable fastening means. In order that the tongues F may possess requisite conductivity and resiliency and also be subject to magnetic attraction they are formed of united metals, such as spring steel and a highly conductive metal such as silver, copper or aluminum. The desired end may be attained by forming the ring 14 and the tongues F of thin flat spring steel coated with copper on both the inner and outer surfaces thereof, the steel providing the essential resiliency and responsiveness to magnetic attraction and the copper coating providing the necessary temperature conductivity.

In assembling the cell A within the shell D the end portions of the cell A have mounted thereon thin flat rings 15 having low temperature conductivity, being preferably formed of steel, tin or plastic, which rings have their outer margins spaced from the wall of the shell D but have pointed projections 16 at intervals along such outer margins which bear at their tips under tension against the shell D so as to center the cell A and also hold it against movement relative to the shell.

After thus mounting the cell A in the shell D the open end of the latter is sealed in the manner employed in the production of vacuum bottles whereby a partial vacuum is produced in the space C encompassing the cell A.

In the construction shown in Figs. 1 and 2, the shell D is stationarily mounted in the housing E with a tip 17 on one end of the shell engaged in a grommet 18 carried on one end of the housing and with the other end of the shell seated in and gripped by a resilient ring 19 seated in the other end of the housing which latter is divided intermediate its ends into separable parts e—f to permit assemblage of the shell therein after which the parts e—f are united.

Turnably mounted in the housing E is an annulus G which encircles the shell D in spaced relation thereto at a point opposite the free end portions of the tongues F and fixed on the inner face of the annulus is a series of spaced permanent magnets 20, 21 and 22 which are arranged to lie opposite the tongues a—b and c when the annulus G is in one extreme position and will be disposed clear of the tongues when the annulus is in its other extreme position as shown in Fig. 2, and such that on turning the annlus G from the last named extreme position to the other, the magnet 20 will travel successively over tongues a and b into register with the tongue c while magnet 21 will travel over tongue a into alignment with tongue b and magnet 22 will move into a position opposite the tongue a.

Means are provided for adjusting the annulus G from the exterior of the housing E, which means is here shown as embodying a stem 23 fixed on the annulus and projecting through a circumferentially extending slot 24 in the housing E. A knurled nut 25 screwed on the outer end of the stem 23 serves as a finger-hold for shifting the annulus and as a clamp for gripping the housing E to thereby releasably hold the annulus against movement from an adjusted position.

In the construction shown in Figs. 3 and 4 the shell D containing the cell A is revolubly mounted in the housing E for turnable movement around its axis, the end tip portion 17 of the shell being pivotally supported in the grommet 18 while the upper end portion of the shell D is encompassed and loosely supported by a ring 26 fastened to the interior of the housing E as by screws 27. A central lug 28 on the upper end wall of the shell D is engaged by a yoke 29 on a revoluble stem 30 extending through said end wall and fitted with a knob 31 constituting a finger-hold whereby the shaft 30 may be turned relative to the housing E on holding the latter and whereby the shell D may be turned within the housing relative thereto.

Fixedly mounted in the housing E as by screws 32 is a ring 33 on which is mounted a series of permanent magnets 20, 21 and 22 disposed in a row on a plane with the outer ends of the tongues F which magnets are spaced apart and positioned so as to lie opposite the tongues a, b and c when the shell E and the cell A therein are disposed in one position, the shell D however being adapted to be disposed to position the tongues to one side of the row of magnets as shown in Fig. 4.

As a means for determining the position of the tongues F relative to the magnets, a spring finger 37 is mounted on the knob 31 and projects laterally therefrom over the adjacent end wall of the housing E which finger carries on the under side of its outer end portion a detent 38 engageable with either of four sockets formed in the housing end wall and designated g, h, i and j as particularly shown in Fig. 5. The socket g is disposed so that when the detent 38 is engaged therewith the tongues F will be disposed clear of the magnets 20, 21 and 22 as shown in Fig. 4. On turning the knob 31 to advance the finger 37 and move the detent 38 progressively into engagement with the sockets h, i and j the tongues a, b and c will be brought progressively opposite the magnets 20, 21 and 22 as indicated in dotted lines in Fig. 4.

In the operation of the invention as shown in Figs. 1 to 4 inclusive the device is initially set so that the series of magnets and the series of tongues will be positioned opposite each other as indicated in dotted lines in Figs. 2 and 4 whereby the magnets will act to attract the outer ends of the tongues and cause them to advance to and be retained in a seated position against the inner face of the shell D and thereby effect a temperature exchanging connection between the shell D and the cell A. The device is then subjected to a desired high or low temperature in any suitable fashion, such as confinement in a heated oven or in a refrigerating chamber, whereby the substance B in the cell A will be caused to absorb such temperature.

On thus subjecting the device to a heating or refrigerating action for a requisite length of time it is removed and set so that the series of magnets and the series of tongues will be disposed out of register with each other as shown in full lines in Figs. 2 and 4.

The temperature absorbed by the substance B will then be substantially confined in the cell A by reason of the latter being insulated from the shell D by the vacuum chamber C. When it is desired to dispense temperature from the cell A in the arrangement shown in Figs. 1 and 2 the annulus G is adjusted by the stem 23 and nut 25 to position one or more of the magnets opposite one or more of the tongues F. When a slow or low delivery of temperature from the cell A is desired the annulus G is adjusted so that the magnet 20 will overlie the single tongue a so that the latter will be advanced under magnetic attraction to its temperature conductive position. Transmission or exchange of temperature will then be confined to the temperature conductivity of the single tongue a. When it is desired to increase the rate of temperature delivery or exchange the annulus G is adjusted to position the magnet 20 opposite the tongue b and dispose the magnet 21 opposite the tongue a. When it is desired to effect maximum rate of discharge or exchange of temperature the annulus G is adjusted so that the series of magnets 20, 21 and 22 will lie opposite the tongues a, b and c.

The operation of the device shown in Figs. 3, 4 and 5 is similar to that above described, except that instead of rotating or adjusting the magnets relative to the cell A the latter is adjusted relative to the magnets. To effect this adjustment as before stated the knob 31 is manipulated to dispose one or more of the tongues a, b and c in operative relation to the magnets 20, 21 and 22.

Obviously on setting the device with the magnets and tongues out of operative alignment the tongues will be retracted under their inherent tension to their normal position.

By coating the ring 14 and tongues F with copper or other highly conductive metal, contact of such metal with the cell A and the shell D will be effected when the tongues are in their conductive position so as to facilitate the desired temperature transfer. By incorporating steel in the tongues F they will be rendered subject to attraction by the magnet and will also possess requisite resiliency so that on being relieved of the attraction of the magnets they will assume their normal position under their inherent tension and then be maintained in spaced relation to the shell D.

Figs. 6, 7 and 8 set forth a device designed for greater capacity than those depicted in Figs. 1 to 5 and above described, the cylindrical cell A being equipped with a pair of sets of five temperature conductive tongues H and J with the tongues H extending downwardly from the upper portion of the cell on one side thereof, while the tongues J extend upwardly from the lower portion of the cell on the other side thereof.

As here shown, particularly in Fig. 9, the sets of tongues

H and J are carried on metallic rings 40—41 respectively, which rings snugly conform to the cylindrical surface of the cell A. The tongues H—J are bi-metallic and comprise strips k formed integral with the rings 40—41 which strips and rings are formed of a metal which is highly conductive, such as silver, copper or aluminum, and are rendered resilient and responsive to magnetic attraction by a strip m of spring steel extending longitudinally of the tongue and seated thereon with one end thereof affixed to the ring 40—41 as by a rivet n and having its other end engaged by a return bend p on the outer end of the tongue. The bend p serves the double purpose of fastening the outer end of the steel strip m and of providing a highly conductive surface on the outer face of the steel strip m for contacting the inner face of the shell D in which the cell A is mounted in the manner set forth in Figs. 1 and 2. The bend p has an outside lateral curvature conforming to the inner face of the shell D to afford a substantial surface contact therewith.

The shell D in this instance is rigidly mounted in a closed housing E, the closed lower end 17 of the shell D being seated and centered in a grommet 18 on the bottom wall of the housing and the shell securely held in an upright position in the housing in spaced relation to the side wall thereof by means of a resilient ring 42 carried by the housing and encircling the shell D in gripping engagement therewith.

Encompassing the upper portion of the shell D is a sleeve 43 having a stem 44 on its upper end extending through the top of the housing and turnably supported therein. The stem carries a fingerhold knob 45 by which the sleeve 43 may be manually rotated.

Mounted interiorly of the sleeve 43 adjacent the lower end thereof is a pair of rows of permanent magnets K—L the rows of magnets being offset relative to each other and arranged on opposite half portions of the sleeve 43 with the row of magnets K disposed on a plane with the free end portions of the set of tongues H and with the row of magnets L disposed on a plane with the free end portions of the tongues J. Normally the sleeve 43 is positioned with the magnets K disposed adjacent the side of the shell D and cell A opposite the half side of the latter bearing the tongues H and with the magnets L disposed on the side of the shell D and cell A opposite the half side of the latter bearing the tongues J so that no magnet will then be positioned opposite a tongue.

Mounted on the knob 45 is a spring finger 46 carrying on the underside of its outer end a hemispherical detent 47 which, when the sleeve 43 is disposed in its normal position as above described, springs into a socket r in the adjacent end wall of the housing to hold the sleeve 43 against free turning movement. A pin 48 extends from the housing end wall to provide an abutment for the finger 46 to limit retrograde movement of the sleeve 43 to the described normal position.

On rotating the knob 45 clockwise from the position shown, the sleeve 43 will advance therewith and initially bring the leading magnets K—L on the sleeve 43 opposite the leading tongues H and J so that said tongues will be attracted by the magnets and thereby be caused to swing outwardly in opposition to the spring strips m thereon and positioned with their outer end portions abutting the shell D. When the tongues are thus disposed transfer of temperature from the cell to the shell will take place.

Continued rotation of the knob 45 and sleeve 43 will successively bring the leading magnet into operative relation to the fingers H—J of each set thereof, with the trailing magnets in their turn assuming the position of the preceding magnet until each of the magnets will be operatively opposed to a tongue H—J so that all the tongues will be disposed in their conducting position. In this fashion by a step by step operation first one tongue H—J of each set thereof, then the second, third, fourth and fifth tongues may be selectively actuated so as to vary the rate of temperature transfer from minimum to maximum according to the desire of the operator. As a means for indicating the several relative positions of the magnets and tongues the upper end wall of the housing E is provided with a series of the indentations r arranged a spaced intervals in the path of travel of the detent 47 or the finger 46, an indentation being disposed in a radia relation to the axis of the sleeve 43 corresponding to tha of a finger H—J. The several indentations are labelec progressively to indicate the "Off," "Low," "Cool," "Me dium," "Cold" and "Frigid" positions of the sleeve 43 where the device is charged to dispense cold temperature or is labeled with appropriate legends where charged tc dispense heat. A stop pin 49 is provided on the housing end wall in the path of the finger 46 to limit clockwise turning movement of the knob 45 and the associatec sleeve 43.

In the construction shown in Fig. 11 wherein parts corresponding to those shown in Figs. 1, 3 and 6 bear corresponding reference characters, the shell D is revolubly mounted and the magnets K—L are fixed on the housing so that in operation the shell D is turned relative to the magnets instead of the magnets being turned relative tc the shell, either of which arrangements accomplishes the same result. As shown in Fig. 11 the magnets K—L are fixed on the inner periphery of a ring 50 mounted on the sidewall of the housing E and fixedly secured thereto as by screws 51. The shell D is pivotally supported at its sealed end in a grommet 52 carried by the bottom wal of the housing. The upper end portion of the shell is loosely encompassed by an annulus 53 fixed on the side wall of the housing E as by screws 54 which annulus serves as a guide bearing for the upper end of the shell D The knob 45 has a stem 55 the inner end of which has a groove which engages a rib 57 on the upper end of the shell D whereby rotation of the knob 45 will effect rota tion of the shell D. The relation of the magnets K—L to spring tongues H—J and their action is identical tc that previously described relative to the structure showr in Figs. 6–7 and 8 and accordingly requires no repetition While the invention has been set forth above as ap plied to a single celled unit, it is obvious that a plural ity of cells and their associated parts may be employec in a single unit as indicated for example in Fig. 1: wherein a pair of the devices M—N are arranged in a single housing P. This arrangement enables productioi of heat exchangers of various capacities with heat ex changing elements of corresponding dimensions.

In charging the cell with cold the device is set in th "Frigid" position wherein all the tongues 8 are dis posed in their heat exchanging position, whereupon th device is placed in a suitable refrigerating chamber o otherwise subjected to a low degree of temperature sucl as to freeze the body B in the cell A. After thus charg ing the cell with cold the device is set in the "Off" posi tion, thus placing the conducting tongues in their re tracted positions and thereby preventing conduction o cold therethrough from the cell A which is then insu lated from the shell D by the vacuum chamber C there in. The pin-point contacts between the cell A and shel D minimize if not prevent transfer of cold therethrough The device when charged will confine cold therein for i prolonged period of time.

Where desired the device may also be charged witl heat and operated as described to effect dispensing there of.

While specific embodiments of the invention have bee shown and described, the invention is not limited to th exact details of construction set forth, and the inven tion embraces such changes, modifications and equiva lents of the parts and their formation and arrangemen as come within the purview of the appended claims.

I claim:

1. A temperature exchanging device comprising temperature charged cell encompassed by a shell in sub stantially insulated spaced relation thereto; and manu ally controlled magnetically actuated means for conduction of the temperature contained in the cell across the space between the cell and the shell.

2. A temperature exchanging device comprising a cell charged with a given temperature, a shell encompassing said cell in spaced relation thereto and substantially insulated therefrom and an arrangement of magnetically attracted heat conductive elements within the space between the cell and the shell normally out of contact with the latter operable to bridge the space and provide temperature conduction, and manually controlled magnetic means on the exterior of the shell for actuating said elements adapted to afford a range of temperature conduction between the cell and the shell.

3. A temperature exchanging device comprising a temperature charged cell encompassed by a shell in substantially insulated spaced relation thereto, an arrangement of temperature conductive elements having magnetic attraction arranged within the space between the cell and the shell engaged with said cell and normally out of contact with said shell, and magnetic means of attracting the temperature conductive elements into contact with the outer shell.

4. In a temperature exchanging device, a temperature conductive shell encasing a vacuum chamber, a temperature loaded cell in said chamber, means supporting said cell in said shell in substtantially non-conductive spaced relation thereto, temperature conductive magnetically responsive elements contacting and carried by said cell normally disposed out of contact with said shell, and manually adjustable magnetic means arranged exteriorly of said shell adjacent thereto adapted to be disposed in and out of magnetically attractive relation to said elements and operable when in such relation to move said elements into temperature conductive relation to said shell.

5. The structure called for in claim 4 in which said heat elements consist of a body of metal having high heat conductive properties arranged to contact the cell at one portion thereof and arranged to be brought into contact with the shell at another portion thereof together with a body of metal associated with said first named body subject to magnetic attraction.

6. In a temperature exchanging device, a temperature conductive shell enclosing a vacuum chamber, a temperature loaded cell supported in said shell in spaced relation thereto, a plurality of temperature conductive magnetically responsive resilient tongues contacting and carried by said cell normally disposed out of contact with said shell, and manually adjustable magnetic means arranged exteriorly of said shell adjacent thereto adapted to be disposed in and out of magnetically attractive relation to said tongues and selectively positionable to attract one or more of said elements into temperature conductive relation to said shell.

7. The structure called for in claim 6 in which said magnetic means embodies a plurality of magnets and a mounting therefor such that the magnets and tongues may be progressively moved in and out of magnetic relation to each other.

8. In a temperature exchanging device, a temperature conductive shell enclosing a vacuum chamber, a temperature loaded cell carried in said shell in spaced relation thereto, a series of temperature conductive magnetically responsive resilient tongues carried by and conductively connected to said cell having free ends normally disposed out of contact with said shell, a series of magnets, and a mounting connected to said shell on which said magnets are carried and disposed for attracting the free ends of said tongues into contact with said shell, said mounting and shell being movable relative to each other to place said magnets and tongues in and out of operative relation to each other.

9. In a temperature exchanging device, a cylindrical temperature loaded cell, a cylindrical shell encompassing said cell in spaced relation thereto and enclosing a vacuum chamber, means supporting said cell in said shell in fixed axial relation thereto, a series of spaced parallel temperature conductive and magnetically responsive resilient tongues affixed at one of the ends thereof to the exterior of said cell and extending longitudinally thereof and having free ends normally spaced from the inner surface of said shell; a series of magnets spaced apart circumferentially of the exterior of said shell contiguous to the surface thereof, and a mounting for said magnets carried by said shell on which said magnets are arranged for positioning opposite the free end portion of said tongues, said mounting and shell being movable relative to each other to dispose said magnets and tongues in and out of magnetically attractive relation to each other, and manually operable means for moving said mounting and shell relative to each other, whereby said magnets may successively advance and retract progressively over said tongues.

10. The structure called for in claim 9 together with a housing enclosing said shell and magnet mounting through which said moving means extends; and means on said housing indicating the relative positions of said magnets and fingers.

References Cited in the file of this patent

UNITED STATES PATENTS

| | | |
|---|---|---|
| 1,535,479 | Kellogg | Apr. 28, 1925 |
| 1,764,194 | Bruehl et al. | June 17, 1930 |
| 2,677,245 | Edmondson | May 4, 1954 |

FOREIGN PATENTS

| | | |
|---|---|---|
| 831,011 | Germany | Feb. 11, 1952 |